(12) United States Patent
Lee et al.

(10) Patent No.: US 8,620,107 B2
(45) Date of Patent: Dec. 31, 2013

(54) APPARATUS AND METHOD FOR EXTRACTING FEATURES OF VIDEO, AND SYSTEM AND METHOD FOR IDENTIFYING VIDEOS USING SAME

(75) Inventors: Seungjae Lee, Daejeon (KR); Wonyoung Yoo, Daejeon (KR); Young-Suk Yoon, Daejeon (KR); Sang Kwang Lee, Daejeon (KR); Yong-Seok Seo, Daejeon (KR); Young Ho Suh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1314 days.

(21) Appl. No.: 12/405,784

(22) Filed: Mar. 17, 2009

(65) Prior Publication Data

US 2009/0238465 A1    Sep. 24, 2009

(30) Foreign Application Priority Data

Mar. 18, 2008    (KR) .......................... 10-2008-0024715

(51) Int. Cl.
*G06K 9/36*    (2006.01)
(52) U.S. Cl.
USPC ........................................................ 382/288
(58) Field of Classification Search
USPC .......................................... 382/190, 205, 288
See application file for complete search history.

(56) References Cited

U.S. PATENT DOCUMENTS

| | | | | |
|---|---|---|---|---|
| 7,539,342 B2 * | 5/2009 | Tabata et al. | ................. | 382/167 |
| 7,917,518 B2 * | 3/2011 | Obrador | ........................ | 707/748 |
| 8,094,872 B1 * | 1/2012 | Yagnik et al. | ................. | 382/100 |
| 8,165,401 B2 * | 4/2012 | Funayama et al. | ............ | 382/190 |
| 2006/0291690 A1 * | 12/2006 | Roberts | ......................... | 382/100 |

FOREIGN PATENT DOCUMENTS

| KR | 10-2004-0054901 | 6/2004 |
|---|---|---|
| KR | 10-0640761 B1 | 10/2006 |
| KR | 10-0649384 B1 | 11/2006 |
| KR | 10-2007-0060588 | 6/2007 |
| KR | 10-2008-0029944 | 4/2008 |
| KR | 10-2008-0078186 A | 8/2008 |

OTHER PUBLICATIONS

Singh et al., Content-Based Matching of Videos Using Local Spatio-temporal Fingerprints, Lecture Notes in Computer Science [on-line], 2007, vol. 4844/2007, pp. 414-423. Retrieved from http://www.springerlink.com/content/t9k65257q343466u/.*

(Continued)

*Primary Examiner* — Matthew Bella
*Assistant Examiner* — Dennis Rosario
(74) *Attorney, Agent, or Firm* — Staas & Halsey LLP

(57) ABSTRACT

An apparatus for extracting features from a video includes a frame rate converter for performing a frame rate conversion on the video to a preset frame rate, a gray scale converter for performing a grey scale conversion on the frame rate-converted video, a frame size normalizer for performing a frame size normalization on the gray scale-converted video to a preset image size, and a feature extractor for partitioning the normalized video into image blocks of a predetermined size, and extracting features from the image blocks on the basis of luminance values of the image blocks. A video identification system employs the feature extracting apparatus to identify an original video and an object video.

4 Claims, 9 Drawing Sheets

(56) References Cited

OTHER PUBLICATIONS

Sarfraz et al., A System for Sign Language Recognition using Fuzzy Object Similarity Tracking, Jul. 6-8, 2005, Ninth International Conference on Information Visulisation, 2005, pp. 233-238.*

Hu et al., The experimental research on star image tracking system [on-line], Mar. 5, 2008 [retrieved on Apr. 10, 2013], Proc. SPIE 6623 International Symposium on Phtoelectronic Detection and Imaging 2007: Image Processing, vol. 6623, pp. 662307-1 thru 662307-9. Retrieved from the Internet: http://proceedings.spiedigitallibrary.org/proceeding.aspx?art.*

Proffitt et al., The roles of contour and luminance distribution in determining perceived centers within shapes [on-line], Jan. 1983 [retrieved on Aug. 9, 2013], Perception & Psychophysics, vol. 33, Issue 1, pp. 63-71. Retrieved from the Internet: http://link.springer.com/article/10.3758/BF03205866#.*

Korean Office Action issued Nov. 11, 2009 in corresponding Korean Patent Application 10-2008-0024715.

Korean Office Action dated Feb. 18, 2010 and issued in corresponding Korean Patent Application 10-2008-0024715.

Job Oostveen, et al., "Feature Extraction and a Database Strategy for Video Fingerprinting", Proceedings of International Conference on Recent Advance in Visial Information Systems, 2002.

Sunil Lee, et al., "Video Fingerprinting Based on Cetroids of Gradient Orientations", Proceedings of ICASSP 2006, vol. 2, pp. 401-404.

* cited by examiner

US 8,620,107 B2

APPARATUS AND METHOD FOR EXTRACTING FEATURES OF VIDEO, AND SYSTEM AND METHOD FOR IDENTIFYING VIDEOS USING SAME

CROSS-REFERENCE(S) TO RELATED APPLICATION(S)

The present invention claims priority of Korean Patent Application No. 10-2008-0024715, filed on Mar. 18, 2008, which is incorporated herein by reference.

FIELD OF THE INVENTION

The present invention relates to a technology for extracting and identifying features of a video, and more particularly, to an apparatus and a method for extracting features of a video, and a system and a method for identifying videos that are suitable for extracting features of image blocks of videos, comparing an object video with an original video using the extracted features of the blocks, and identifying the videos using the comparison result.

BACKGROUND OF THE INVENTION

As well known, with the spread of digital devices such as portable multimedia players (PMP) and DivX players and Internet environments such as WiBro (wireless broadband) and FTTH (Fiber To The Home), digitalized music, dramas, and movies has become easily played back, and promptly transferred and shared.

Furthermore, infringement of copyrights due to illegal transfer and sharing of digital contents having copyrights has also been increased. In particular, damage to video contents is being increased due to a fall in prices of memories and increase in data transfer rate.

In such environments, demand for video filtering systems based on video identification is increasing to protect video contents. A video filtering system generally extracts unique features of an original video requiring protection of copyright, and stores the extracted features in a database. If it is requested to transfer and share video contents, the video filtering system extracts features of an object video and compares the extracted features with those of the original video stored in the database in order to determine whether or not the video filtering system filters the object video using the comparison result.

In particular, it is very important to extract features of a video despite that the video is subject to compression, conversion in size, and conversion in frame rate during transfer and sharing of the video to perform video filtering.

Meanwhile, conventional technologies for extracting and identifying features of a video have been suggested in the art.

A conventional technology is suggested by Job Oosteven et al, "Feature Extraction and a Database Strategy for Video Fingerprinting" (Proceeding of International Conference on Recent Advances in Visual Information Systems, 2002). This paper presents a method for the identification of video. The method includes calculating average luminance of image blocks and extracting features of images using differences between the average luminance in temporal and spatial domain to identify the videos.

Another conventional technology is suggested by in Sunil Lee and Chang D. Yoo, "VIDEO FINGERPRINTING BASED ON CENTROIDS OF GRADIENT ORIENTATIONS," Proc. ICASSP 2006, vol 2., pp. 401-404. Lee's method includes dividing an input video into blocks, calculating centroids of gradient orientations of the blocks using luminance of the blocks and performing a fingerprinting matching based on the centroids of gradient orientations.

However, the Oosteven's method has an advantage of search efficiency, but a drawback in that identification ratio is relatively low with respect to variation in luminance and uniformization of histogram. Further, the Lee's method is effective in respect to a variety of compression techniques and change in size, but requires a large amount of calculations since centroids of gradient orientations with respect to all pixels needs to be calculated.

SUMMARY OF THE INVENTION

Therefore, in view of the above problems, it is an object of the present invention to provide an apparatus and a method for extracting features of a video not only requiring a small amount of calculations but also being able to extract features of the video despite that the video is subject to variation in size, compression, and conversion in frame rate, and a video identification system and a method using the same.

It is another object of the present invention to provide an apparatus and a method for extracting features of a video, and a system and a method for the video identification that effectively identify videos using the determinant of a matrix containing the centroid coordinate of the luminance values of image blocks of the videos and the centric coordinate of the image blocks.

In accordance with a first aspect of the present invention, there is provided an apparatus for extracting features from a video, which includes: a frame rate converter for performing a frame rate conversion on the video to a preset frame rate; a gray scale converter for performing a grey scale conversion on the frame rate-converted video; a frame size normalizer for performing a frame size normalization on the gray scale-converted video to a preset image size; and a feature extractor for partitioning the normalized video into image blocks of a predetermined size, and extracting features from the image blocks on the basis of luminance values of the image blocks.

In accordance with a second aspect of the present invention, there is provided a method for extracting features from a video, which includes: performing a frame rate conversion on the video to a preset frame rate; performing a grey scale conversion on the frame rate-converted video; performing a frame size normalization on the gray scale-converted video to a preset image size; and partitioning the normalized video into image blocks of a predetermined size; and extracting features from the image blocks on the basis of luminance values of the image blocks.

In accordance with a third aspect of the present invention, there is provided a system for identifying videos, which includes: a feature database for storing features extracted from an original video; a feature extracting block for extracting features of an object video to be compared with the original video on the basis of luminance values of the object video; a search block for searching in the feature database to find features of the original video corresponding to the object video; and a feature matching block for comparing the distance between the features of the original video and the respective features of the object video to produce a comparison result.

In accordance with a fourth aspect of the present invention, there is provided a method for identifying videos, which includes: extracting and registering features on the basis of luminance values of an original video; extracting, upon receipt of an object video to be compared to the original video, features of the object video on the basis of luminance values of the object video; searching for candidate features of the original video corresponding to the object video; and comparing the distance between the features of the original video and the object video to produce the comparison result on the basis of a preset threshold.

In accordance with the present invention, rapid calculation speed is secured by a small amount of calculations when the features of video are extracted. Accordingly, an original video and object video are effectively identified, contributing to protection of copyright.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENT

Hereinafter, embodiments of the present invention will be described in detail with reference to the accompanying drawings.

Figure 1:
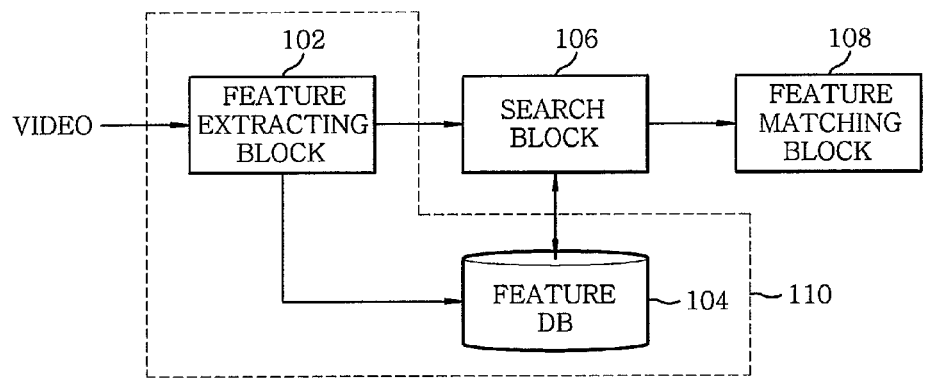
FIG. 1 is a block diagram of a video identification system suitable for identifying videos using features of the videos in accordance with the present invention.

FIG. 1 is a block diagram of a video identification system suitable for comparing and identifying videos using features according to luminance of the videos in accordance with an embodiment of the present invention. The video identification system includes a feature extracting block 102, a feature DB 104, a search block 106, and a feature matching block 108.

The feature extracting block 102 and the feature DB 104 constitute an apparatus 110 for extracting features of a video, description of which will be firstly made as follows.

The feature extracting block 102 extracts features of image blocks of a video (or video clips) provided thereto. Upon receiving the video, the feature extracting block 102 converts a frame rate of the video into a predetermined frame rate, converts the video to a gray scale, and normalizes the frame size of the video. Further, the feature extracting block 102 partitions the normalized video to image blocks of a predetermined size (for example, n×m) to extract the features of the image blocks.

Figure 2:
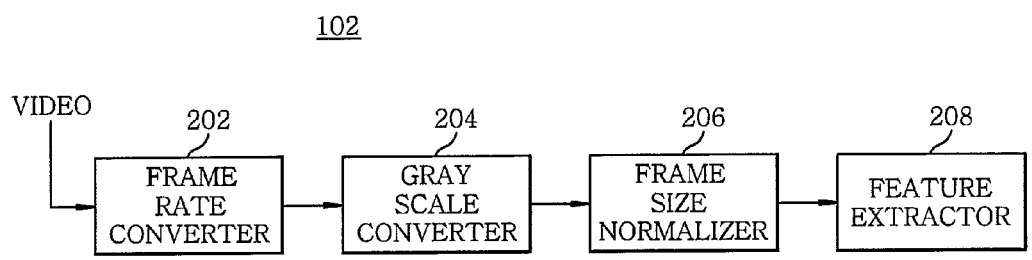
FIG. 2 is a block diagram of a feature extracting block shown in FIG. 1.

FIG. 2 is a detailed block diagram of the feature extracting block 102 shown in FIG. 1. The feature extracting block 102 includes a frame rate converter 202, a gray scale converter 204, a frame size normalizer 206, and a feature extractor 208.

The frame rate converter 202 converts the frame rate of the video to a preset frame rate. Such a frame rate conversion may help to effectively extract the features of the video despite of the change in the video on a time axis.

The gray scale converter 204 removes color components of the video, and converts it into the grayscale image containing only luminance information. The frame size normalizer 206 normalizes frames of the video converted to the grayscale image to a preset image size to produce normalized frames of the video.

The feature extractor 208 partitions the respective normalized frames into image blocks of a fixed size (for example, N by M), extracts features of the respective image blocks, and outputs feature vectors corresponding to the features.

A process of extracting features of the respective image blocks will be described hereinafter in detail as follows.

In the present invention, the feature extraction of an image block uses a centroid coordinate of luminance values of the image block and a centric coordinate of the image block. First, in the case of there being a matrix A of 2×2 as in Equation 1, the determinant of the matrix A may be expressed as in Equation 2.

$$A = \begin{bmatrix} a & b \\ c & d \end{bmatrix} \quad \text{[Equation 1]}$$

$$\det(A) = ad - bc \quad \text{[Equation 2]}$$

The determinant of the matrix is used to analyze the system of a linear equation and obtain the solution of the linear equation. If all the elements in the matrix A are a real number greater than '0', the absolute value of the determinant represents the area of a parallelogram having '(0, 0), (a, b), (c, d), (a+c, b+d)' and its sign represents the relative position between '(a, b)' and '(c, d)'.

Figure 5:
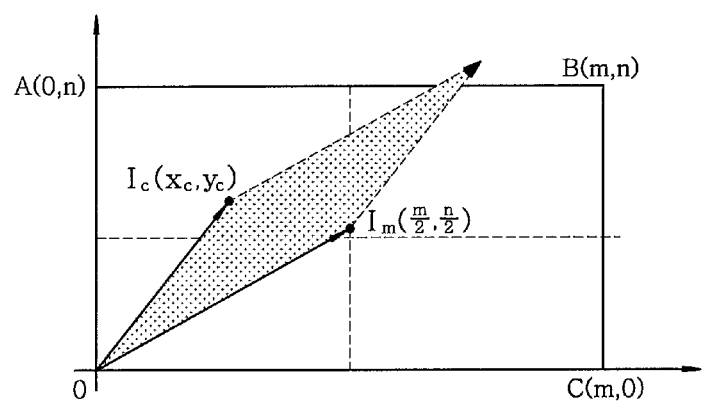
FIG. 5 is a view illustrating the centroid coordinate luminance values of image blocks and the centric coordinate of the image blocks in accordance with the present invention.

For example, as illustrated in FIG. 5, an image block of n×m may have a centric coordinate of the image block, $$I_m\left(\frac{m}{2}, \frac{m}{2}\right),$$

and a centroid coordinate obtained using luminance value of the image block, '$I_c(x_c, y_c)$', and may be expressed as a matrix F as in Expression 3.

$$F = \begin{bmatrix} x_c & y_c \\ \frac{m}{2} & \frac{n}{2} \end{bmatrix} \quad \text{[Equation 3]}$$

In the centroid coordinate $I_c(x_c, y_c)$, $x_c$ and $y_c$ are calculated in Equation 4.

$$y_c = \frac{\sum_{i=1}^{m} j \sum_{j=1}^{n} V(i, j)}{\sum_{i=1}^{m} \sum_{j=1}^{n} V(i, j)} \quad \text{[Equation 4]}$$

where, V(i,j) is a luminance value of a $(i, j)^{th}$ image block.

Then, the determinant of the matrix F has values ranging as in Equation 5, and has a symmetrical distribution about '0'.

$$-\frac{mn}{2} \le \det(F) \le \frac{mn}{2} \quad \text{[Equation 5]}$$

The determinant of the matrix F represents a feature of the image block. Therefore, the features corresponding to the numbers of image blocks are extracted as the features of the video.

For example, assuming that a frame rate is '10 fp', a normalized image size is '320×240', and the number of image blocks is '4×4', and a time length of a video clip is 10 seconds, the number of features become '10×10×16' and one frame has 16 features.

Each of the features can be represented by a feature vector of 16 dimensions, and the features represented by the feature vectors are registered and stored as video information in the feature DB 104 along with frame rate and frame size of the video. In this regard, the features may be used to create an index for the videos or may be stored in the feature DB 104 in a tree structure. Furthermore, the features may be binarized to reduce storage space in the feature DB 104, or the real parts of the features may be converted to a character type integer to be stored.

The video identification system employs the video feature extracting apparatus 100 as set forth above, description of which will be made with respect again to FIG. 1.

As described above, after the video information including the features of an original video has been registered in the feature DB 104, upon the receipt of an object video to be compared, the feature extracting block 202 will extract features of the object video and transfers them to the search block 106.

The search block 106 searches for the feature DB 104 to extract video information corresponding to the original video using the features of the object video.

The feature matching block 108 compares the features of the object video and the features of the original video to produce a comparison result.

More particularly, in comparing the features of the object video and the original video, assuming that a j-th feature of an I-th frame of the object video is q(i,j) and a k-th feature of the original video is p(i, j, k), the distance between the features can be expressed as in Equation 6.

$$D(k) = \frac{1}{LN}\sum_{i=1}^{L}\sum_{j=1}^{N} |p(i, j, k) - q(i, j)| \quad \text{[Equation 6]}$$

where D(k) is a distance between the features, L is the number of frames to be compared and N is the dimension of the features.

Consequently, the feature matching block 108 produce a feature value and location of the videos in which the distance D(k) becomes minimal as its comparison result. When the distance D(k) is deviated from a preset error range, the object video is determined to be different from the original video.

Figure 3:
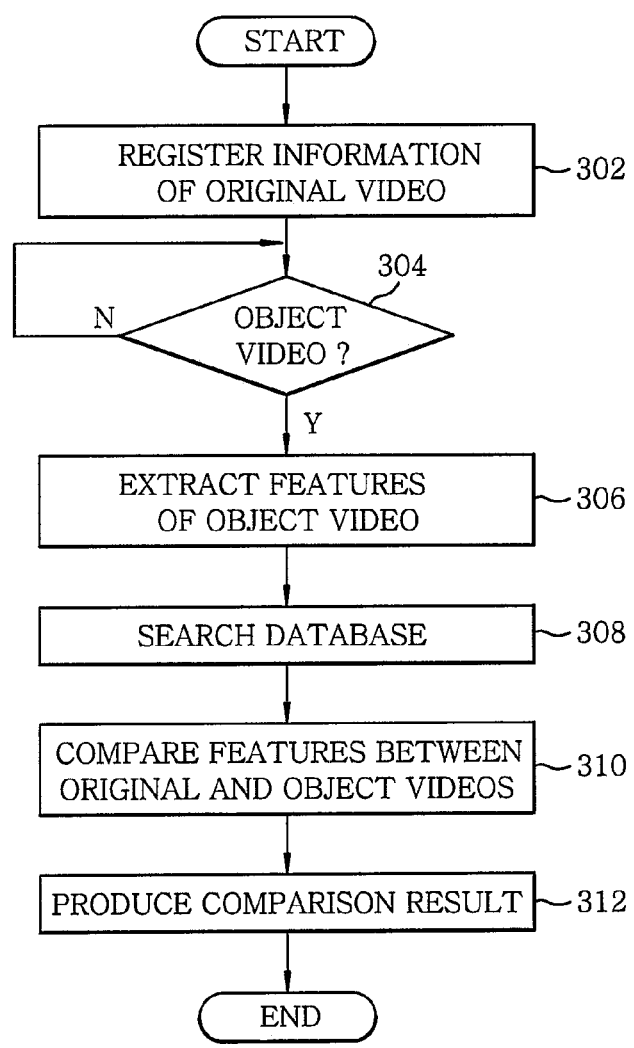
FIG. 3 is a flowchart illustrating a process of identifying videos using features of the videos in accordance with the present invention.

FIG. 3 is a flowchart illustrating a process of comparing and identifying videos using features based on image luminance of the videos in accordance with an embodiment of the present invention.

First, in step 302, a process is performed to register features of an original video in the feature DB 104. To do it, the feature extractor 102 performs a frame rate conversion, a gray scale conversion, a normalization, and a block-wise feature extraction with respect to the original video. The video information including the features based on image luminance of the original video is then registered in the feature DB 104. The feature extraction to be performed by the feature extraction block 102 will be described later in detail with reference FIG. 4.

After construction of the feature DB 104 for the original video, if there is a request to transfer and share contents of an object video in step 304, the feature extraction block 102 performs a frame rate conversion, a gray scale conversion, a frame size normalization, and a block-wise feature extraction with respect to the object video to extract features based on image luminance values of the object video, as similar as in the step 302. The extracted features are then provided to the search block 106.

In step 308, the search block 106 searches for the feature DB 104 to extract video information corresponding to the original video using the features of the object video.

Thereafter, in step 310, the feature matching block 108 compares the distance D(k) between the features of the original video and each of the features of the object video. Thereafter, in step 312, the feature matching block 108 produces a comparison result such as feature values and locations of the original and the object videos in which the distance D(k) becomes minimal. The object video is then determined to be different from the original video if the distance D(k) deviates from the preset error range (a threshold value preset with respect to the distance D(k)).

Figure 4:
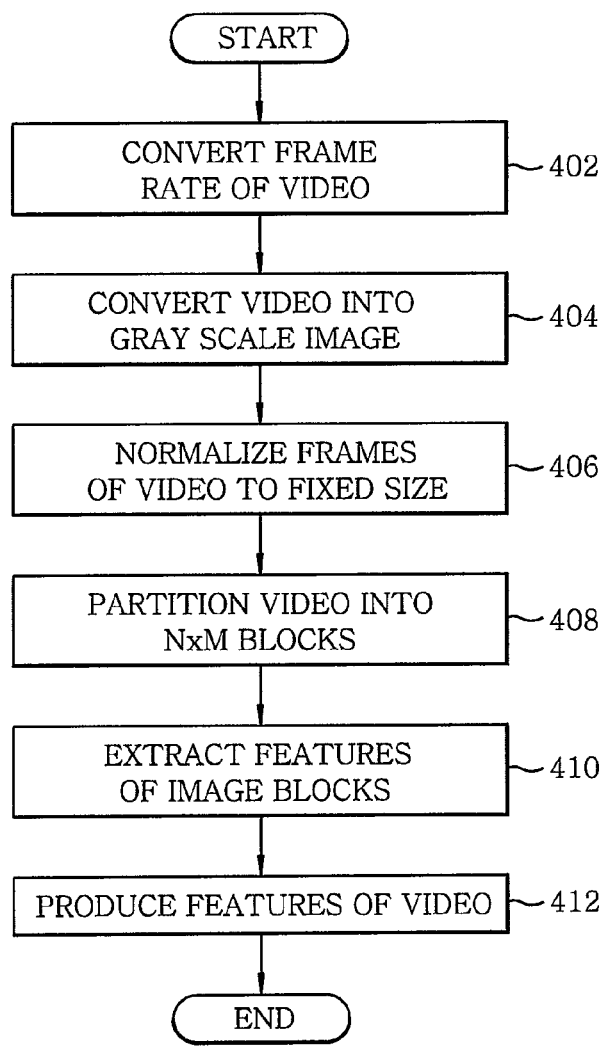
FIG. 4 is a flowchart of a process of extracting features of a video in accordance with the present invention.

FIG. 4 is a flowchart illustrating a process of extracting features of original or object video performed by the feature extraction block 102 shown in FIG. 1.

In step 402, the frame rate converter 202 converts the frame rate of the video to a preset frame rate to extract the features of the.

In step 404, the gray scale converter 204 removes color information of the video whose frame rate is converted and converts the video to a gray image containing only luminance information.

In step 406, the frame size normalizer 206 normalizes the video which has been converted to a gray image according to a preset image size.

Thereafter, in step 408, the feature extractor 208 partitions the normalized video from the frame size normalizer 206 to image blocks of a predetermined size (for example, a size of n×m).

In step 410, the feature extractor 208 extracts features of the image blocks. The features of the image blocks are extracted using the centroid coordinate of the luminance values of the image blocks and the centric coordinate of the image blocks.

As described with reference to FIG. 5, the centric coordinate of an image block, $$I_m\left(\frac{m}{2}, \frac{m}{2}\right),$$

and the centroid coordinate of luminance values of the image block, $I_c(x_c, y_c)$, are expressed as a matrix F as in Equation 3, and then $x_c$ and $y_c$ of $I_c(x_c, y_c)$ are calculated as in Equation 4. The determinant of the matrix F is stored as the feature of the image block, and the features corresponding to the number of the image blocks with respect to the normalized frame are extracted as the features of the video.

Thereafter, in step 412, the feature extractor 208 outputs feature vectors corresponding to the features, and the features represented by the feature vectors are registered and stored in the feature DB 104

Accordingly, the features can be extracted using the centric coordinate of the image blocks and the centroid coordinate depending on luminance values of the image blocks with respect to the video.

Figure 6:
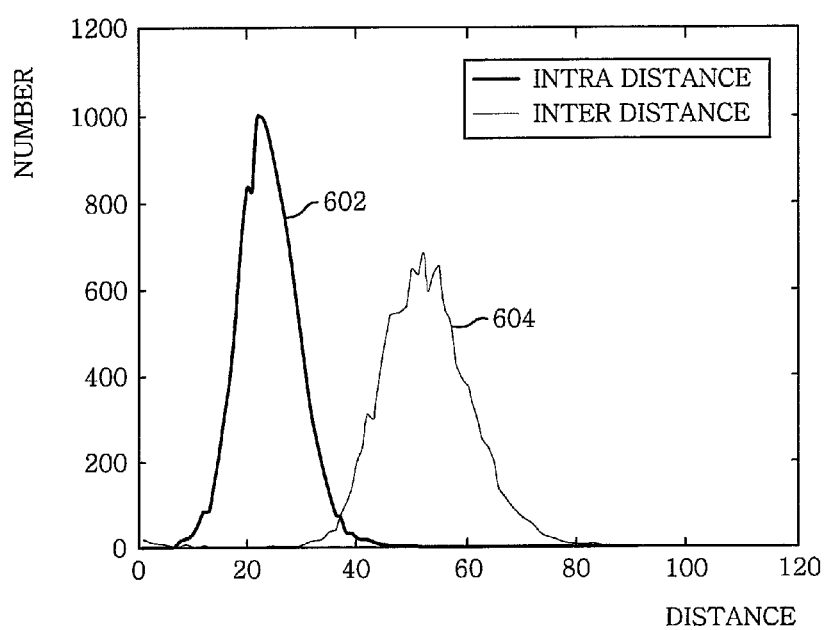
FIG. 6 is a view illustrating distribution of a distance between features of an original video and a distorted video from the original video, and a distance between features of the original video and an object video.

FIG. 6 is a view illustrating distribution of distances (intra distance) between features of an original video and a distorted video signal from the original video, and distribution of distances (inter distance) between features of the original video and the other object video different from the original video. In particular, FIG. 6 represents the distribution of the distances between the features obtained using Equation 6 in case where the original video is a frame rate of 24 fp, a frame size of 640×264, and 135 kbps in DivX; and the distorted video is a frame rate of 24 fp, a frame size of 353×264, 39 kbps in DviX, and caption inserted video.

Assuming that L=100, N=16, and the number of features is 12,937 in Equation 6, the comparison result in FIG. 6 shows that a distribution 602 of the distances between the original video and the distorted video is different from a distribution 604 of the distances between the original video and the other object video. Therefore, by settling a threshold having a specific distance expressed in Equation 6, distortion of an object video from the original video can be determined.

FIGS. 7 to 11 are views illustrating experimental results obtained by comparing a prior art and the present invention.

Figure 7:
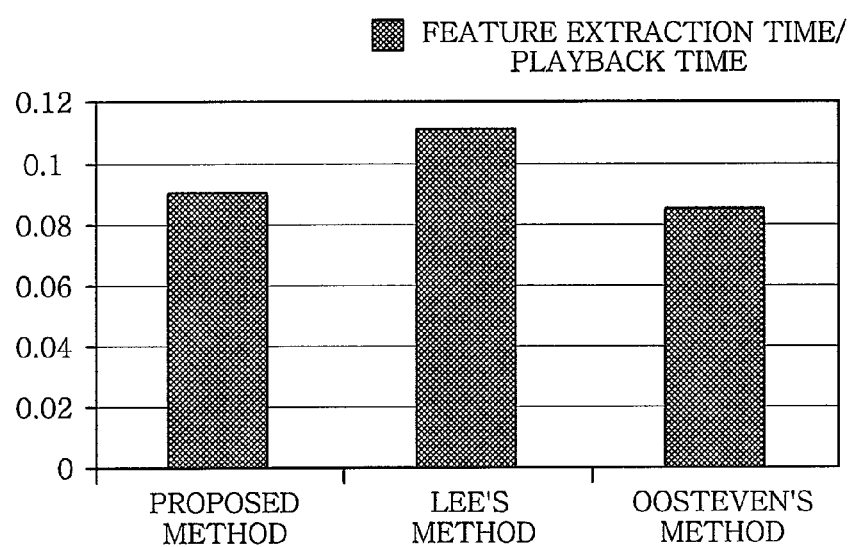
FIGS. 7 to 11 are views illustrating experimental results obtained by comparing a method of a prior art and a proposed method of the present invention.

In FIG. 7, the experimental result illustrates the ratio of a feature extraction time to a playback time of a video obtained by performing a proposed method of the present invention, Lee's method, and Oosteven's method. In the experiment, it was conducted in a condition of 'N=16', and the video has 10 hours of playback time. As illustrated in FIG. 7, it can be seen that the ratio of the extraction time/the playback time obtained by the proposed method is approximately 81.2% of that of the Lee's method, and exceeds by approximately 10% in comparison with that of the Oosteven's method.

In addition to the required time to extract the features, an accuracy to identify the distorted video is also an important issue. To test the accuracy, two Test Sets were prepared as follows:

(1) Test Set 1
genre: action
original video: a frame size of 640×352; 132 kbps; no caption; a frame rate of 24 fp
distorted video: a frame size of 352×288; 39 kbps in DivX; caption inserted; 24 fp.

(2) Test Set 2
genre: drama
original image: a frame size of 640×352; 172 kbps; no caption; a frame rate of 30 fp
distorted image: a frame size of 352×264; 39 kbps in DivX; caption inserted; a frame rate of 15 fp.

In these test sets, the parameters used in extracting the features from the original and distorted videos were commonly applied to the original and distorted videos under condition that a frame rate is 10 fp, a frame size is 320×240, and each feature has 16 (4×4) dimensions.

Figure 8A:
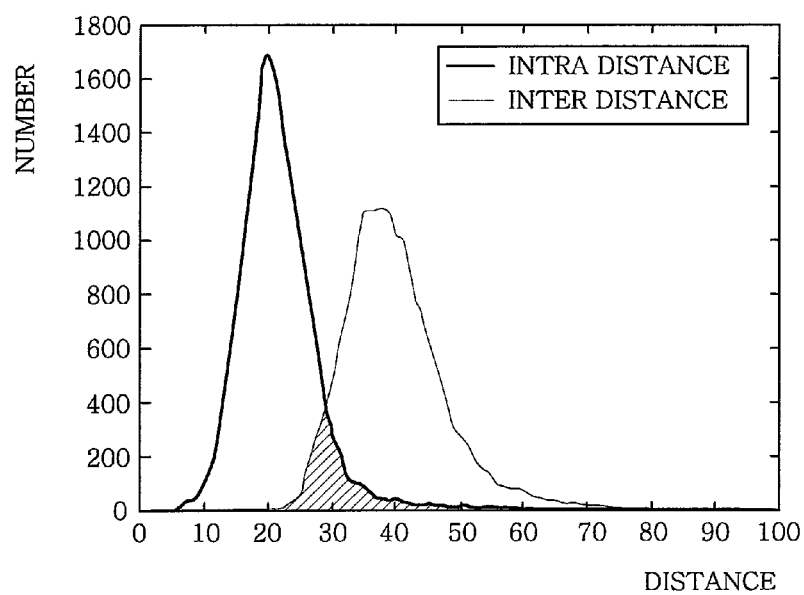
Figure 8B:
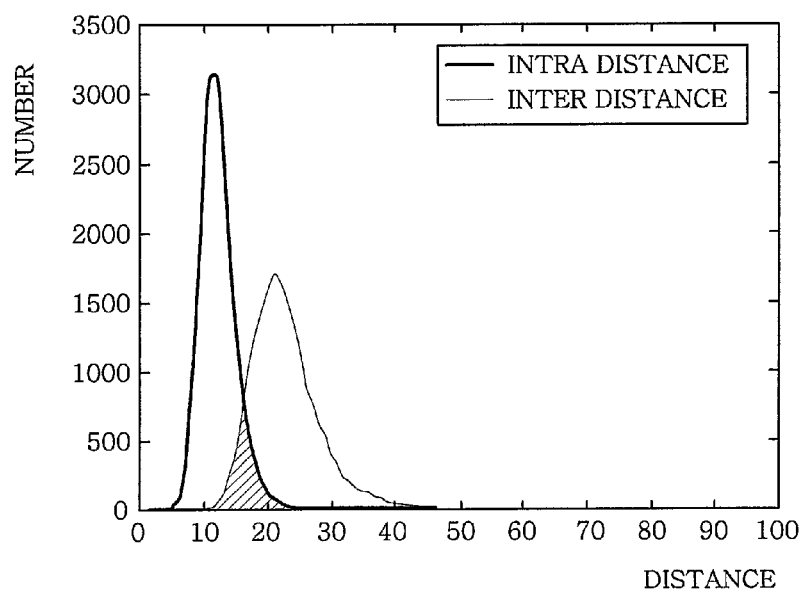
Figure 9:
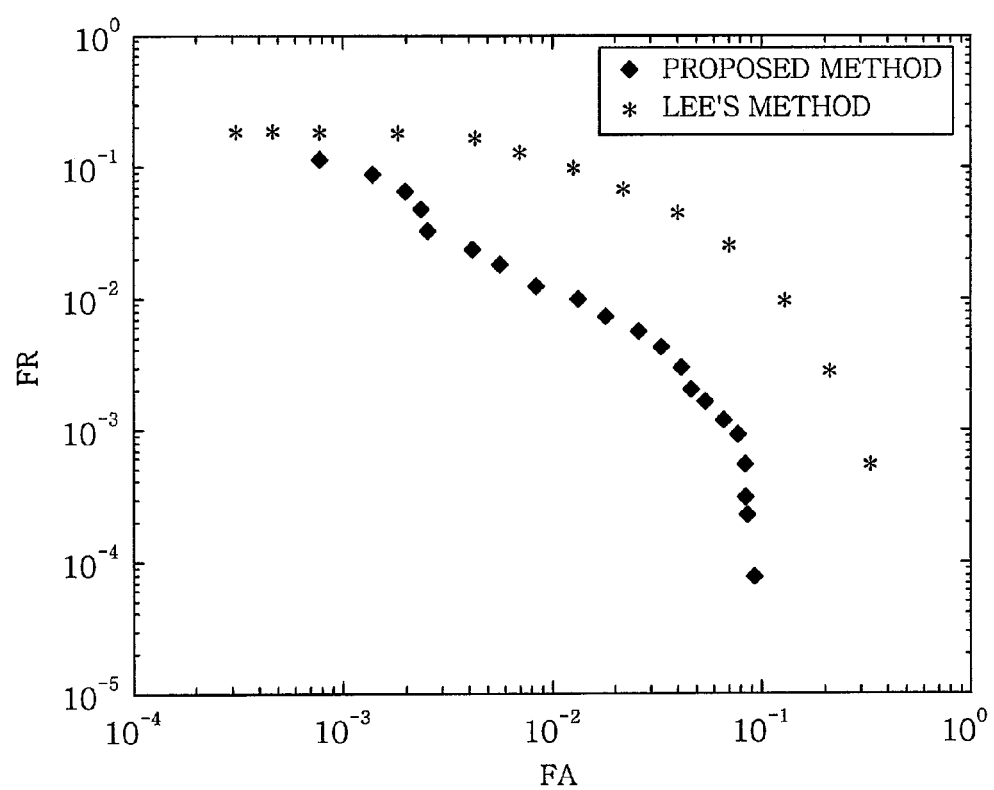

FIGS. 8A and 8B represent test results of intra distance and inter distance measured by using the Lee's method and the proposed method of the present invention with respect to the Test set 1, respectively. As illustrated in FIGS. 8A and 8B, it can be seen that overlapped region of the distance distributions obtained by using the proposed method is relatively smaller than that of the Lee's method. Furthermore, as illustrated in FIG. 9 representing ROC (Receiver Operating Characteristic) curves, it is apparent that a ROC curve of the proposed method has a lower plot than that of the Lee's method, and therefore, the proposed method has a better accuracy over the Lee's method. In FIG. 9, FA in x-axis denotes False Alarm Probability and FR denotes False Rejection Probability.

Figure 10A:
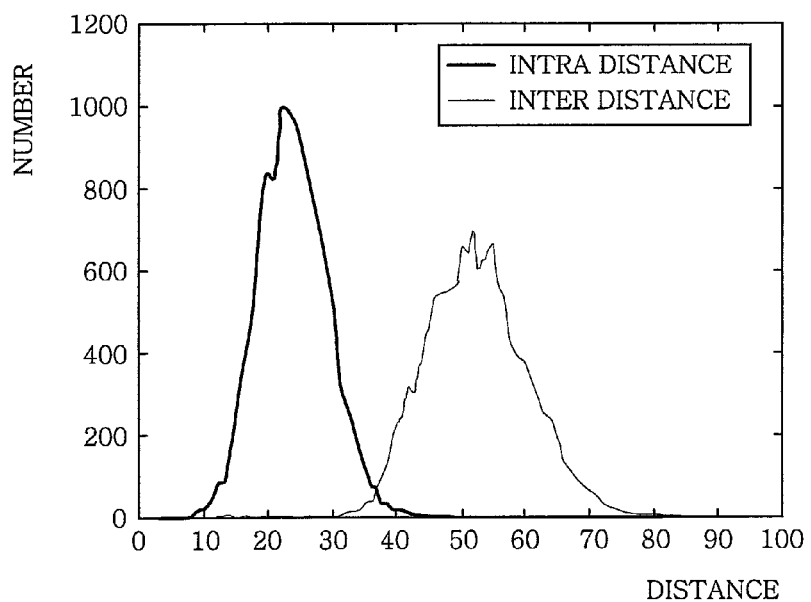
Figure 10B:
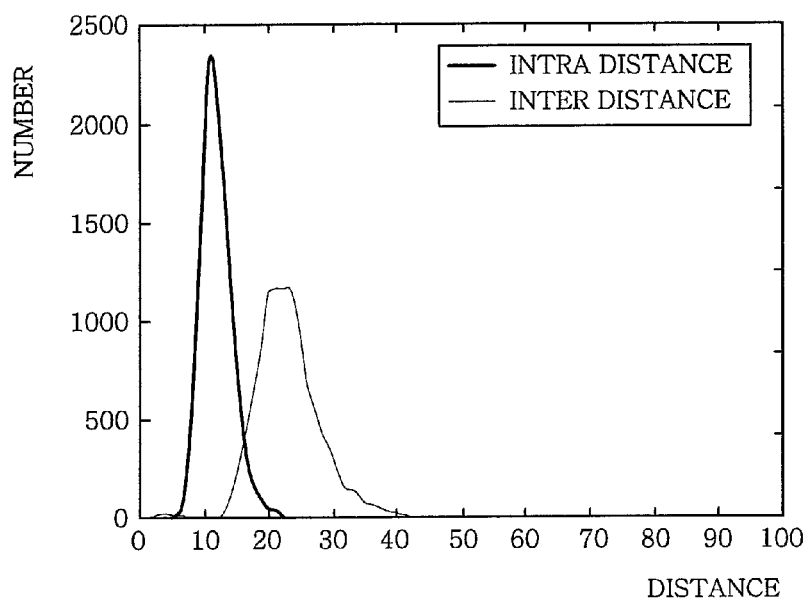
Figure 11:
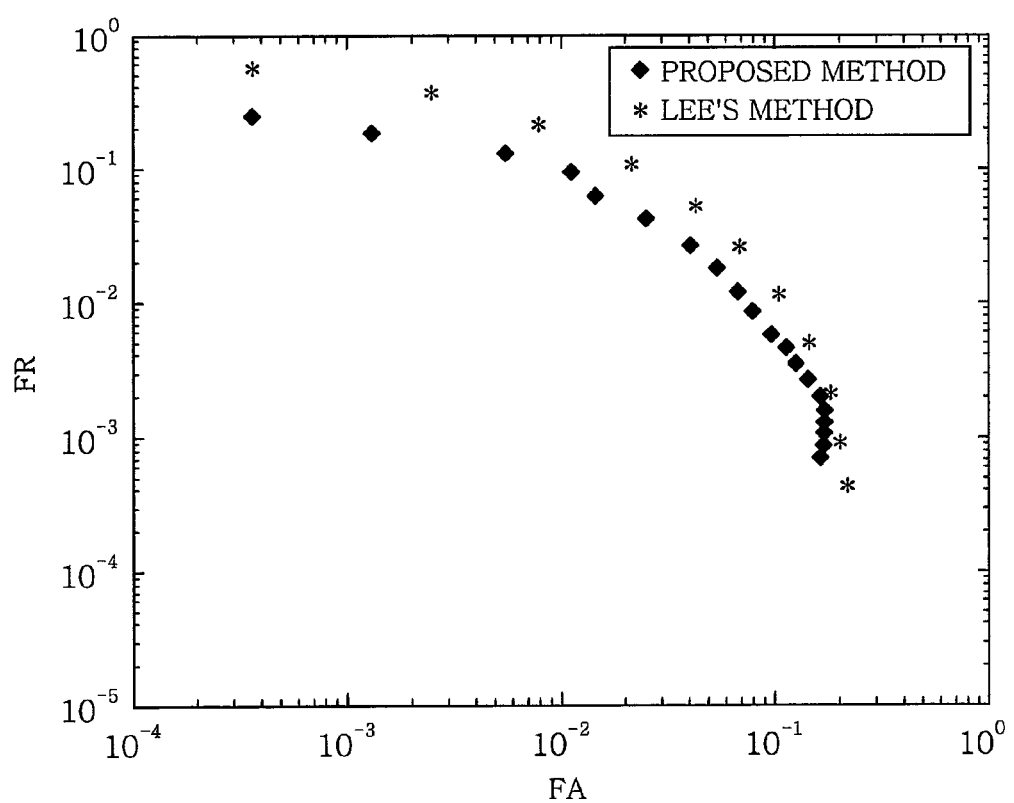

Similarly to FIGS. 8A and 8B, and FIG. 9, FIGS. 10A and 10B, and FIG. 11 represent test results of intra distance and inter distance measured by using the Lee's method and the proposed method with respect to the Test set 2. As illustrated in FIGS. 10A and 10B, it can be seen that an overlapped region of the distance distributions obtained by using the proposed method is also relatively smaller than that of the Lee's method. Furthermore, as can be seen from FIG. 11, the proposed method has a better accuracy over the conventional technology.

Although the preferred embodiments of the present invention have been disclosed for illustrative purposes, those skilled in the art will appreciate that various modifications, additions and substitutions are possible, without departing from the scope of the invention as disclosed in the accompanying claims.

What is claimed is:

1. A device for extracting features from a video comprising:
   a frame rate converter performing a frame rate conversion on the video to a preset frame rate;
   a gray scale converter performing a grey scale conversion on the frame rate-converted video;
   a frame size normalizer performing a frame size normalization on the gray scale-converted video to a preset image size; and
   a feature extractor partitioning the normalized video into image blocks of a predetermined size, and extracting features from the image blocks on the basis of luminance values of the image blocks,
   wherein the feature extractor extracts the features by using centroid coordinate of the luminance values in the image blocks and centric coordinate of the image blocks,
   wherein the feature extractor extracts the features by calculating the determinant of a matrix including the centroid coordinate and the centric coordinate.

2. The device of claim 1, wherein the feature extractor produces feature vectors having a dimension corresponding to the size of the image blocks using the determinant as the features.

3. A method for extracting features from a video comprising:
   performing a frame rate conversion on the video to a preset frame rate;
   performing a grey scale conversion on the frame rate-converted video;
   performing a frame size normalization on the gray scale-converted video to a preset image size;
   partitioning the normalized video into image blocks of a predetermined size; and
   extracting features from the image blocks on the basis of luminance values of the image blocks,
   wherein the features are extracted by using centroid coordinate of luminance values in the image blocks and centric coordinate of the image blocks,
   wherein the features are extracted by calculating the determinant of a matrix including the centroid coordinate and the centric coordinate.

4. The method of claim 3, further comprising producing feature vectors corresponding to the features after extracting the features.

* * * * *